No. 757,584. PATENTED APR. 19, 1904.
B. WERTHEIMER.
MACHINE FOR MANUFACTURING CIGARS.
APPLICATION FILED JAN. 18, 1901.
NO MODEL. 2 SHEETS—SHEET 1.

Witnesses
R. A. Boswell.
R. E. Pritchett.

Inventor
B. Wertheimer
By B. Singer
Attorney

No. 757,584. PATENTED APR. 19, 1904.
B. WERTHEIMER.
MACHINE FOR MANUFACTURING CIGARS.
APPLICATION FILED JAN. 18, 1901.
NO MODEL. 2 SHEETS—SHEET 2.
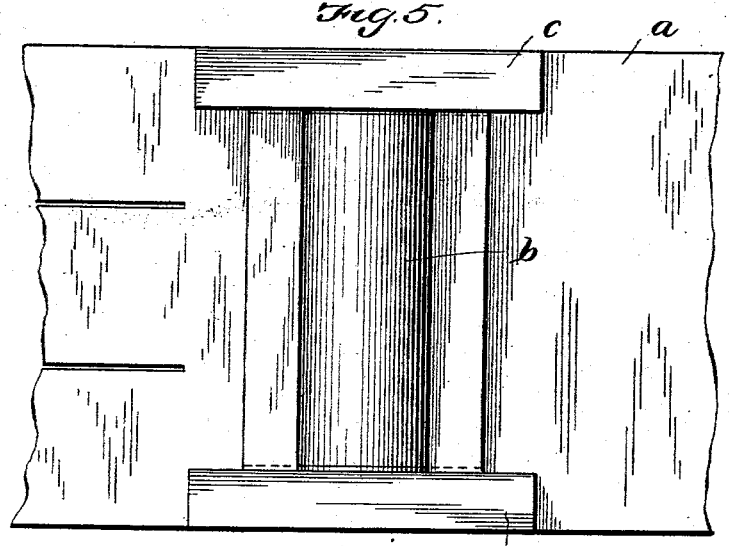
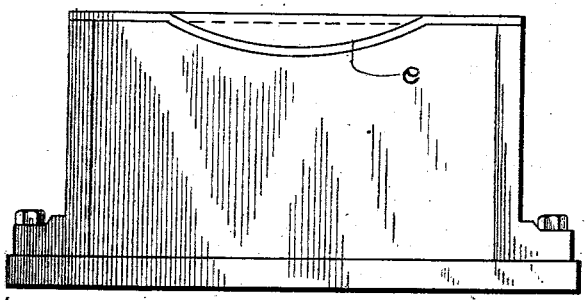
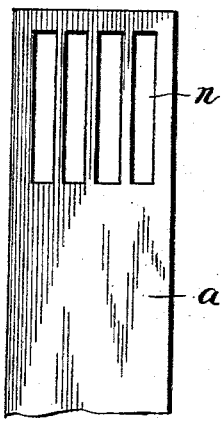
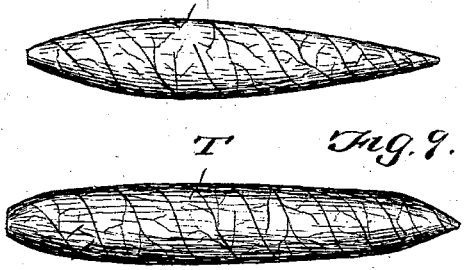

No. 757,584. Patented April 19, 1904.

UNITED STATES PATENT OFFICE.

BERNHARD WERTHEIMER, OF KARLSRUHE, GERMANY.

MACHINE FOR MANUFACTURING CIGARS.

SPECIFICATION forming part of Letters Patent No. 757,584, dated April 19, 1904.

Application filed January 18, 1901. Serial No. 43,792. (No model.)

*To all whom it may concern:*

Be it known that I, BERNHARD WERTHEIMER, a subject of the Grand Duke of Baden, residing at Karlsruhe, in the Grand Duchy of Baden, in the German Empire, have invented new and useful Improvements in Machines for Manufacturing Cigars, of which the following is a specification.

The subject of the present invention is a machine for manufacturing cigars of various shapes and performing all the stages of manufacture. The new machine presents numerous advantages over constructions at present in use. It is adapted to make cigars of any desired form or kind, whether of uniform diameter from end to end or tapering at one or both ends.

Figure 1:
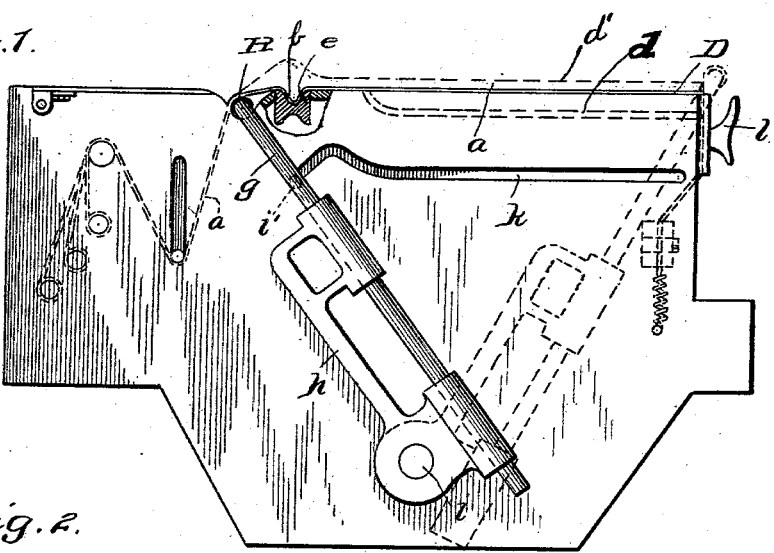
Figure 2:
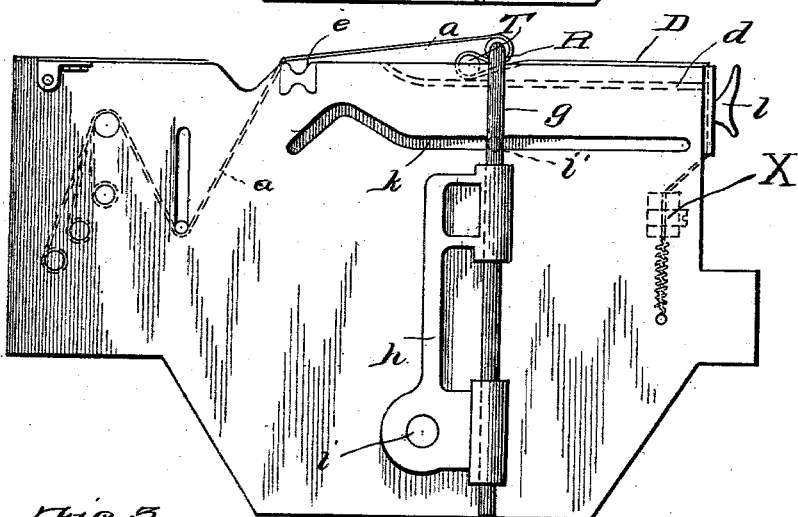
Figures 3, 4:
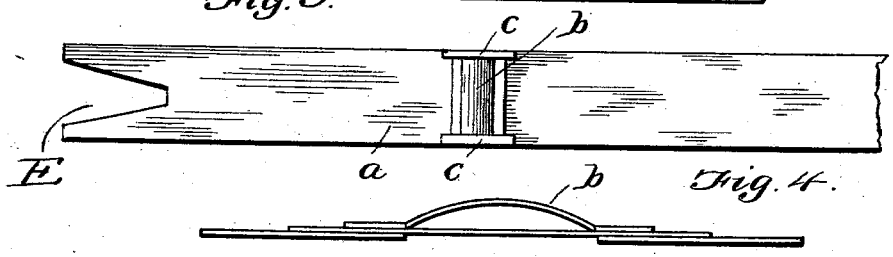

In the accompanying drawings, illustrating my new machine and all accessory parts, Figure 1 is a view in side elevation of my improved machine. Fig. 2 is a similar view showing the parts in different positions. Fig. 3 is a plan view of my improved apron. Fig. 4 is an edge view of the same. Fig. 5 is a plan view of a portion of the apron on an enlarged scale. Fig. 6 is a front elevation. Fig. 7 is a detail view showing a portion of the form of apron adapted for rolling cylindrical cigars; and Figs. 8 and 9 show cigars of different shapes, the former being tapered toward both ends and the latter pointed at one end only.

In the apron $a$, near one end, is inserted a rubber strip $b$, which extends almost entirely across the apron. To provide this construction, the apron may be cut in two and the sections thereof united not only by the rubber strip $b$, but by two fabric strips $c$. These fabric strips $c$, which are inelastic, are of such length that normally when the rubber strip $b$ is not stretched they extend in an arched form from one section of the apron to the other or form a bridge, as shown in Fig. 4. The apron is arranged in the machine in such a position that the rubber or elastic section thereof, which has been inserted as above described, comes directly in front of the roller R when in the position shown in Fig. 1.

If it is desired to make cigars which are relatively thick in the middle and taper toward each end, the apron is adjusted as an ordinary apron would be if it were desired to produce a cigar having a uniform thickness corresponding to the thickness of the ends, but less than that of the middle portion of the cigar really to be made. As heretofore stated, this adjusting means may be of any desired construction and is therefore only diagrammatically illustrated, the same being designated by X.

In adjusting the apron a cylindrical wooden templet is laid in the loop of the apron, and by means of the adjusting device the templet is allowed only as much space as corresponds approximately to the thickness of the end section of the cigar to be rolled.

In stretching the apron or adjusting the machine the india-rubber sheet $b$ yields to such an extent as to cause the bridge $c$ to be stretched out smooth and flat with the other parts of the apron. Consequently when the roller R rolls the cigar-filler in the loop the elastic sheet $b$ yields where the filler is thickest and the cross-section of the filler at the ends of the cigar is limited by the non-elastic material of the apron. The filler thus receives the desired form as it is advanced over the rolling-table. At each rotation the cigar is moved farther away from the elastic section of the apron and the effect of this section on the cigar is diminished, so that the cigar naturally tends to assume a cylindrical form. Therefore at the end of the apron where the cigar is covered with its wrapper and is finished a piece is cut out from the apron, as indicated at E in Fig. 3, so that the apron consists here of two separated bands, though still forming a connected whole. When the piece that is cut out is wedge shape with straight edges, a cigar of the form shown in Fig. 8 will be made. When the filler rolled up in the binder reaches the forked or bifurcated end of the apron, it is confined only at the two ends, as the intermediate portion of the apron is removed, so that the apron consists virtually only of two side strips. This allows the middle of the filler to expand and then to be worked into shape.

The apron of course need not be made of only one piece cut as before described, but could be formed of a series of sections properly arranged and connected.

As long as the bound filler is advanced by the roller R on the table D the filler and cigar lie behind the roller R, and the condition of the plate or surface, whether smooth or rough, has little influence upon the shaping of the cigar. At the point, however, where the filler leaves the loop and expands it is necessary to provide the path through which it moves with a depression corresponding to the form of the cigar to be made. This depression or hollow $d$ is clearly shown in Fig. 6. Owing to this arrangement the cigar leaves the machine complete with the exception of the tip.

To make the cigar, the apron $a$ is first pressed in the mold $e$, Figs. 1 and 2, and the hollow thus formed is filled with tobacco. The roller R is now caused to rise over the mold in a path shown by the dotted lines $d'$ in Fig. 1. From this it will be seen that the roller R first rises in a curve, passing above the mold $e$, and then travels parallel to the table D. To obtain this motion, the roller R is mounted on a guide-rod $g$, held by an arm $h$ so that it is free to slide longitudinally. The arm $h$ is mounted on a shaft $i$, turned by a treadle. If the arm $h$ turns, the rod $g$ is carried with it and is also moved longitudinally by means of the guide-roller $i''$, secured to said rod $g$ and sliding in the curved slot $k$. The roller R having passed over the mold $e$ causes the apron $a$ to form a loop, as shown in Fig. 2, and thus the bunch previously placed in the mold $e$ is rolled upon the table D and covered with a binder, and continuing its motion the roller comes into approximately the position shown in full lines in Fig. 2, where the wrapper is begun to be applied. The cigar is finished, with the exception of the tip, when it arrives at the end of the machine and falls into the holder $l$.

This device is described with reference to the formation of cigars tapered at either or both ends. If a cylindrical cigar is to be made, the apron $a$, as shown in Fig. 7, is provided with a series of slots $n$ instead of being cut away at one end, as at E or E' in Fig. 3. Through the series of slots $n$ brushes can extend to smooth down the outer wrapper.

Having thus described the invention, what is claimed as new, and desired to be secured by Letters Patent, is—

1. In a cigar-making machine, an apron for rolling tobacco, having an elastic section, which is adapted to have the cigar-filler placed thereon, and inelastic strips of greater length than the normal width of the elastic section extending across said elastic section.

2. In a cigar-making machine, an apron for rolling tobacco having a portion, removed and replaced by a section of elastic sheeting, and two inelastic strips bridging said elastic section at the sides of the apron, said strips being of greater length than the normal, unstretched, width of the section of elastic sheeting.

3. In a cigar-making machine, an apron having an intermediate portion of one end removed, whereby a cigar rolled by said apron will when engaged by said end be confined at its ends and unconfined throughout more or less of its body, the shape of the portion removed from the apron determining the form of the finished cigar.

4. In a cigar-making machine, the combination of an apron having an intermediate elastic section and having one end forked or bifurcated, and inelastic strips extending across said elastic section and of a length greater than the normal length of said section, and a rolling-table having a depression or hollow in which the unconfined portion of a cigar held by the forked end of the apron can freely move.

In testimony whereof I affix my signature in presence of two witnesses.

BERNHARD WERTHEIMER.

Witnesses:
 JACOB ADRIAN,
 H. W. HARRIS.